(12) United States Patent
Kim

(10) Patent No.: US 7,492,131 B2
(45) Date of Patent: Feb. 17, 2009

(54) VARIABLE DRIVE SWITCHING REGULATOR ARCHITECTURE

(75) Inventor: Jason Seung-Min Kim, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1 day.

(21) Appl. No.: 11/277,812

(22) Filed: Mar. 29, 2006

(65) Prior Publication Data

US 2007/0229039 A1  Oct. 4, 2007

(51) Int. Cl.
*G05F 1/10* (2006.01)
*G05F 1/652* (2006.01)
*G05F 1/656* (2006.01)

(52) U.S. Cl. .................. 323/222; 323/282; 323/284; 323/286

(58) Field of Classification Search .......... 323/222, 323/282, 284, 286
See application file for complete search history.

(56) References Cited

U.S. PATENT DOCUMENTS

| 6,043,634 | A  | * | 3/2000  | Nguyen et al. | 323/272 |
|-----------|----|---|---------|---------------|---------|
| 6,441,597 | B1 | * | 8/2002  | Lethellier    | 323/282 |
| 6,667,603 | B2 | * | 12/2003 | Hiraki et al. | 323/268 |
| 6,850,045 | B2 | * | 2/2005  | Muratov et al.| 323/272 |
| 6,979,980 | B1 | * | 12/2005 | Hesterman et al. | 323/222 |
| 6,979,982 | B2 | * | 12/2005 | Herbert       | 323/272 |
| 7,071,660 | B2 | * | 7/2006  | Xu et al.     | 323/266 |
| 7,078,884 | B2 | * | 7/2006  | Miura et al.  | 323/272 |
| 7,122,995 | B2 | * | 10/2006 | Hasegawa et al. | 323/272 |
| 7,285,941 | B2 | * | 10/2007 | Cha           | 323/272 |

* cited by examiner

*Primary Examiner*—Bao Q Vu

(57) ABSTRACT

A circuit for use in powering a load having dynamic power needs. A variable strength controller is provided that has a feedback terminal, at least one p-terminal, and at least one n-terminal. The p- and n-terminals are each suitable for driving a respective semiconductor device to partially control the power to the load as the said feedback terminal receives a feedback signal representative of actual demand for the power by the load. A total of at least three p- and n-terminals are provided, and their selective employment thus collectively fully controls the power to the load.

16 Claims, 4 Drawing Sheets

High Efficiency Switch Regulator Architecture for a Variable Load

Regular clock

PFM, pulse frequency modulation (aka pulse skipping)

PWM, pulse width modulation

High Efficiency Switch Regulator Architecture for a Variable Load

| State particulars | Clock particulars | Voltages particulars | Tasks particulars |
|---|---|---|---|
| Cold boot state 212 | | | |
| POST sub-state 230 | 12 MHz | 1.2V, 1.8V, 3.3V | RTC |
| cold boot sub-state 232 | 80 MHz, PLL | 1.2V, 1.8V, 3.3V | LCD, DAC, GSM |
| Run state 214 | | | |
| standby sub-state 240 | 32 KHz, Osc | 1.2V, 1.8V, 3.3V | DAC-pd, GSM-pd |
| playback sub-state 242 | 18 MHz, Skips | 1.2V, 1.8V, 3.3V | DAC-on, GSM-pd |
| call sub-state 244 | 24 MHz, Osc | 1.2V, 1.8V, 3.3V | DAC-on, GSM-on |
| capture sub-state 246 | 48 MHz, Doubler | 1.2V, 1.8V, 3.3V | CAM-on |
| menu sub-state 248 | 80 MHz, PLL | 1.2V, 1.8V, 3.3V | KEY-on |
| Warm boot state 216 | | | |
| power down sub-state 250 | 32 KHz | | RTC |
| hibernate sub-state 252 | 32 KHz | Off, 1.8V, Off | RTC |
| warm boot sub-state 254 | 12 MHz | 1.2V, 1.8V, 3.3V | |

FIG. 4

VARIABLE DRIVE SWITCHING REGULATOR ARCHITECTURE

TECHNICAL FIELD

The present invention relates generally to electricity and power supply systems, and more particularly to such systems that include a plurality of transistors that are operated such that they are either conductive or nonconductive to each contribute to the final control of the output.

BACKGROUND ART

Switching regulators are widely used for powering modem electronic devices. For example, a power source, say, a battery or fuel cell may provide a voltage (Vin, sometimes also called a source) from which it is desired to provide a steady voltage (Vout, sometimes also called a drain) to an application load.

Unfortunately, however, prior art switching regulators have architectures that are not good at handling changing load conditions in power managed systems where the load currents vary drastically between different system operating modes.

For example, many prior art switching regulators simply employ one or more pulse skipping modes (a form of pulse frequency modulation, or PFM) to cope with a demand for less than their designed maximum power consumption. This results in less than ideal power conversion efficiency because the internal drive strength still remains strong to accommodate the potential maximum load. Furthermore, the pulse skipping nature of such PFM switching regulators can cause slower response to rapid load current changes, which tends to create excessive output voltage ripple.

Other prior art switching regulators employ pulse duration changing modes (pulse width modulation, or PWM) to cope with demands for less than design-maximum power consumption. This can be an improvement over PFM approaches in some applications, and some integrated circuit manufactures today provide devices that can selectively employ PWM or PFM to drive external power semiconductors.

Unfortunately, the PWM approach as implemented in prior art switching regulators is still not particularly good at handling drastically changing load conditions in different system operating modes. The design of these regulators is still focused on maximum power consumption and, when a load is not requiring this, these regulators also have less than optimal power conversion efficiency.

FIG. 1a (prior art) is a block diagram stylistically depicting a generic conventional switching regulator. The regulator depicted here is buck type (Vin>Vout), but the comments here generally apply to boost type regulators (Vin<Vout), and buck/boost types as well. The regulator depicted here also employs both a p-type and an n-type transistor. Although not especially relevant, some conventional switching regulator designs simply use a diode in place of the n-type transistor shown in FIG. 1a. FIG. 1b (background art) stylistically depicts the waveforms the Ctrl block in FIG. 1a might employ. At full load the drive signals to the power switching transistors will resemble the regular clock signal. That is, it will be roughly symmetrical (in practice, slightly reduced pulse widths may be used to avoid overlap issues). In a PFM based design at a lower than maximum load, the drive signals to the power switching transistors will resemble the middle signal shown. And in a PWM based design at a lower than maximum load, the drive signals to the power switching transistors will resemble the lower signal shown.

Briefly summarizing, these two traditional approaches can be viewed as clock changing and duty cycle changing. And neither of these approaches is good at handling drastically changing load conditions in different system operating modes, which is increasingly the case in modem electronic devices. In a "lines powered" application such inefficiency may be tolerable, albeit undesirable, but in a battery or other limited power source application such inefficiency can lead to an entire "parade of horribles." For example, power inefficiency will shorten battery life for disposable batteries, or shorten charge life for rechargeable batteries. Using unduly large batteries, or replacing smaller ones unduly often, can therefore result in waste disposal problems. Many electronic component and device manufactures today are concerned about this, out of environmental awareness and increasingly due to outright governmental regulation. Indirectly, power inefficiency can also result in thermal issues. For instance, some laptop computers today are notorious for burning their user's laps if some form of extra insulation is not used.

Accordingly, improved architectures for switching regulators that serve changing load conditions remain desirable and can expect to be well received by electronics manufacturers, users of the products from those manufacturers, and by those concerned with the general public good.

DISCLOSURE OF INVENTION

Accordingly, it is an object of the present invention to provide an improved switching regulator architecture.

Briefly, one preferred embodiment of the present invention is a circuit for use in powering a load having dynamic power needs. A variable strength controller is provided that has a feedback terminal, at least one p-terminal, and at least one n-terminal. The p-terminals and said n-terminals are each suitable for providing a drive signal to drive a respective semiconductor device to partially control the power to the load as the feedback terminal receives a feedback signal representative of actual demand for the power by the load. A total of at least three of the p-terminals and n-terminals are provided and their selective employment is what collectively fully controls the power to the load.

Briefly, another preferred embodiment of the present invention is a switching regulator. A circuit as just described is provided along with an inductive-capacitive network, a feedback network, and p-device instances and n-device instances of the semiconductor devices. The inductive-capacitive network delivers the power to the load at a drain terminal and a common terminal. The feedback network is connected to the inductive-capacitive network, to provide the feedback signal based on the actual demand for the power by the load. The p-device instances control flow of the power from a source terminal, when respectively driven by the drive signals from the p-terminals. This partially supplies the inductive-capacitive network and partially provides the power to the load. The n-device instances control flow of the power from the common terminal, when respectively driven by the drive signals from the n-terminals. This further partially supplies the inductive-capacitive network and also partially provides the power to the load. The p– and n-device instances collectively are connected to receive the power into the switching regulator at a source terminal and the common terminal, and to provide the power to the inductive-capacitive network.

Briefly, another preferred embodiment of the present invention is a process for providing power to a load having dynamic power needs. A voltage level is representatively measures at the load. Then a drive strength increment is determined. A set of drive signals are selectively provided, based on the drive strength increment and the voltage level, to at least one p-instance and at least one n-instance of semiconductor devices, wherein the p-instances control flow of the power from a source terminal and the n-instances control flow of the power from a common terminal, and wherein a total of at least three of the p- and n-instances are employed.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended tables and figures of drawings in which:

And FIG. 4 is a table of particulars for the various states in FIG. 3, as well as of some of their notable features.

In the various figures of the drawings, like references are used to denote like or similar elements or steps.

BEST MODE FOR CARRYING OUT THE INVENTION

Figure 1A:
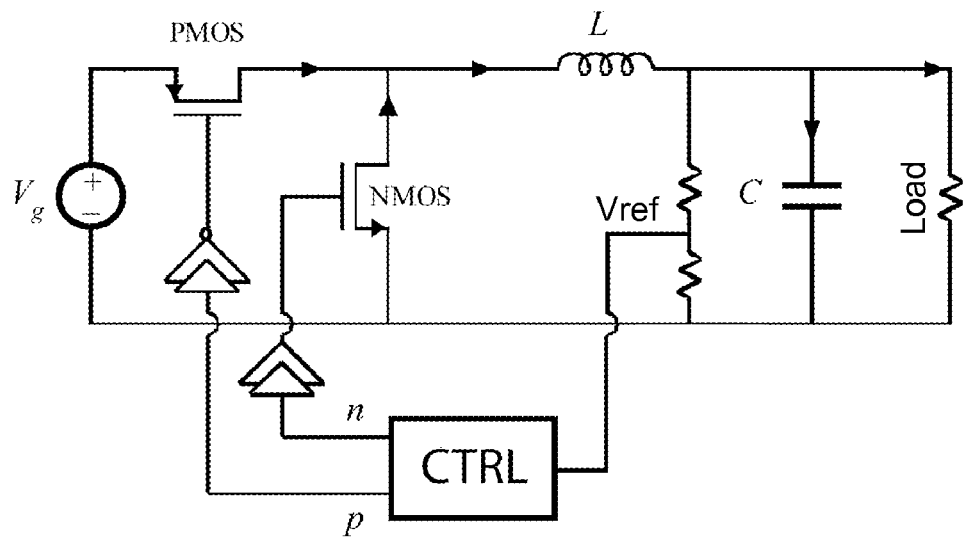
FIGS. 1a-b depicting relevant aspects of conventional switching regulators, wherein FIG. 1a (prior art) is a block diagram depicting a generic switching regulator and FIG. 1b (background art) depicts waveforms the regulator in FIG. 1a might employ.
Figure 1B:
Figure 1B:
Figure 1B:

A preferred embodiment of the present invention is switching regulator architecture for variable drive strength. As illustrated in the various drawings herein, and particularly in the view of FIG. 2, preferred embodiments of the invention are depicted by the general reference character 10.

Figure 2:
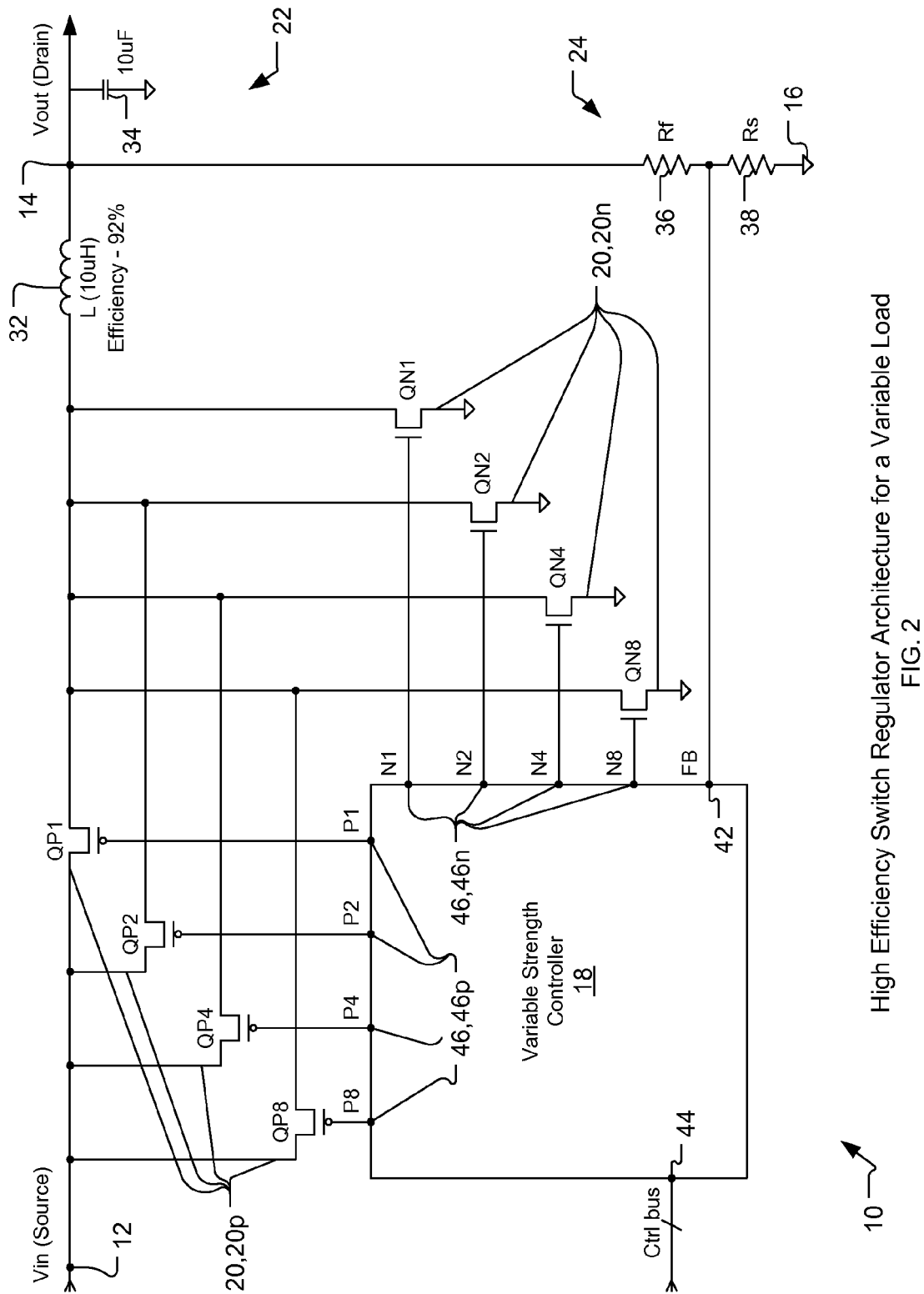
FIG. 2 is a schematic block diagram depicting a switching regulator architecture in accord with the present invention.

FIG. 2 is a schematic block diagram depicting a switching regulator architecture 10 in accord with the present invention that utilizes multiple sets of switching transistors (here, QP1 . . . QP8 and QN1 . . . QN8 as shown) to provide dynamic drive strength. The switching regulator architecture 10 has an input node 12 (Vin), an output node 14 (Vout), and a common 16 (Vg). The switching regulator architecture 10 includes a variable strength controller 18, a plurality of switch transistors 20, an LC network 22, and a feedback network 24.

The LC network 22 and the feedback network 24 can be entirely conventional. For example, the LC network 22 in FIG. 2 includes a single inductor 32 and a single capacitor 34, and the feedback network 24 includes a first resister 36 and a second resister 38 connected in a simple voltage divider arrangement. Of course, different component values and different arrangements of these components may be used instead, but that is not especially germane to the present invention and should be straightforward to one ordinary skill in the switching regulator arts.

The variable strength controller 18 can be a buck type, a boost type, or a buck/boost type. In general, the following discussion will use examples where the variable strength controller 18 is a buck type (i.e., where Vin>Vout; e.g., where a battery source of nominally 4.5V, 6V, or 9V is to be used to power a 1.2V, 1.8V, or 3.3V circuit). The variable strength controller 18 has a feedback terminal 42, an optional control bus 44, and multiple drive terminals 46 including one of more P-terminals 46p, and one or more N-terminals 46n. The variable strength controller 18 also has conventional connections to power for its own needs (e.g., to Vin and Vg), but these are omitted in FIG. 2 for clarity.

The switch transistors 20 are of two complimentary types which we herein term P-transistors 20p and N-transistors 20n. The inventor has found that PMOS and NMOS FET types of transistors are particularly suitable for use in this invention, but other types of semiconductors may also be employed. In general, many of the traditional considerations for choosing semiconductor power-switching devices in a conventional switching regulator should also apply when selecting the switch transistors 20 for the inventive switching regulator architecture 10.

In FIG. 2 four P-transistors 20p and four N-transistors 20n are shown, and these are each respectively controlled by either a P-terminal 44a or an N-terminal 44b of the variable strength controller 18. This conveniently provides sixteen binary increments or effective drive strengths that are suitable to cover an 1× to 16× range of potential load currents.

It should be noted that other quantities of switch transistors 20 can also be suitable, depending largely on the particular load characteristics of an application. For example, in principle, as few as one P-transistor 20p and two N-transistors 20n can be used (connected to one P-terminal 44a and two N-terminals 44b). Or two P-transistors 20p and one N-transistor 20n can be used (connected to two P-terminals 44a and one N-terminal 44b). Either of these arrangements will provide an 1× to 3× range of drive strengths. It is anticipated, however, that most embodiments will employ at least two P-transistors 20p and two N-transistors 20n (used with two P-terminals 44a and two N-terminals 44b, and thus providing at least an 1× to 4× range).

It should also be noted that the individual switch transistors 20 shown in FIG. 2 can actually be implemented as multiple devices in parallel. This is done in many conventional switching regulators for various reasons, such as accommodating limited current or thermal capacities in individual devices, and to facilitate physical placement on heat sinks or in housings. The inventive switching regulator architecture 10 can also use such arrangements, if desired. For instance, each of QP1 . . . QP8 and QN1 . . . QN8 in FIG. 2 could actually be implemented as QP1a-b . . . QP8a-b and QN1a-b . . . QN8a-b (16 total devices), but still with the same four terminals (P1 . . . P8 and N1 . . . N8) used to now each drive an a-b pair (thus still effectively acting as 8 devices).

Figure 3:
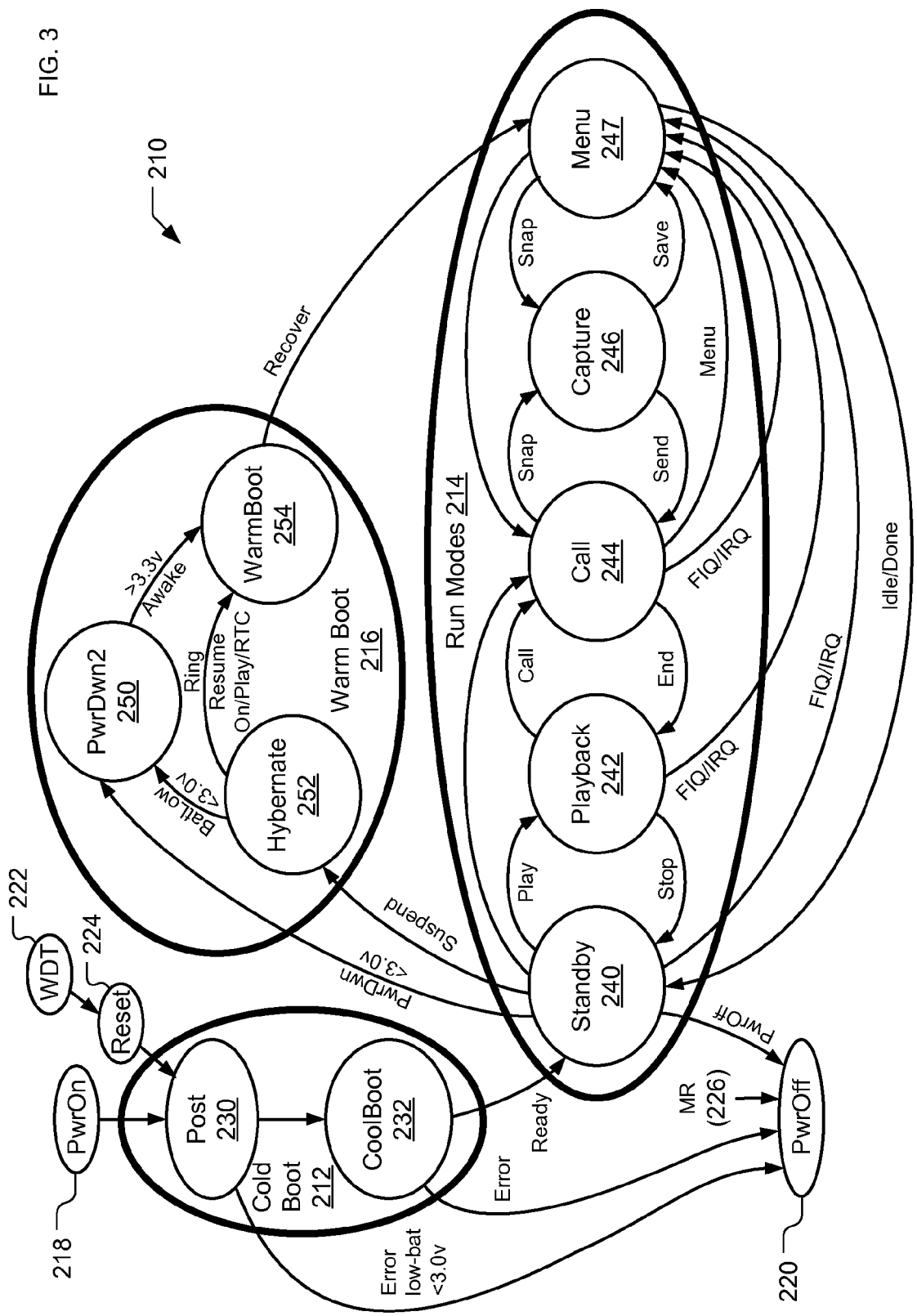
FIG. 3 is a state diagram for a personal digital appliance (PDA) that might employ the switching regulator architecture of FIG. 2.

FIG. 3 depicts a personal digital appliance state diagram (PDA state diagram 210) with which the inventive switching regulator architecture 10 is employed. The PDA here particularly has music playback, telephone communications, and camera capabilities. As shown in FIG. 3, the PDA state diagram 210 has three major states: a cold boot state 212, a run state 214, and a warm boot state 216. In addition to these it further has power on 218 and power off 220, a watch-dog timer (WDT 222) and a reset 224, and a master reset 226. FIG. 4 is a table of particulars for the various states and their notable features.

Within the cold boot state 212 are a sub-state for power on reset (POST sub-state 230) and a cold boot sub-state 232. Within the run state 214 are a standby sub-state 240, a playback sub-state 242, a call sub-state 244, a capture sub-state 246, and a menu sub-state 248. And within the warm boot state 216 are a power down sub-state 250, a hibernate sub-state 252, and a warm boot sub-state 254.

The POST sub-state 230, within the cold boot state 212, is reached from either power on 218 or reset 224 (and indirectly also from WDT 222). The reset 224 and WDT 222 options can be entirely conventional. For instance, they can be software accessible means to perform a low-level restart of the PDA short of actually powering it down and then powering it back up again. [When even this is not enough, the master reset 226 serves.]

In the application here the POST sub-state 230 uses a 12 MHz clock (one-half of the frequency of a primary oscillator), and the switching regulator architecture 10 is capable of outputting 1.2V, 1.8V, and 3.3V. The two exit paths from the POST sub-state 230 are related to the latter of these voltage levels. If less than 3.0V is available (e.g., due to a low battery condition) an error has occurred and the next state is power off 220. Alternately, if greater than 3.0V is available (optimally >3.3V) the next state is the cold boot sub-state 232. The major task performed by the POST sub-state 230 is providing a real time clock (RTC).

The cold boot sub-state 232 uses an 80 MHz clock (derived with a phase locked loop (PLL) based on the 24 MHz primary oscillator). One rationale for this is to get to the run state 214 expeditiously, so that a user can start to employ their PDA productively. Accordingly, now that the basic and desirably cautious POST sub-state 230 is completed, speed and high power expense are appropriate. Of course, if there is an error in the cold boot sub-state 232, the next state is power off 220.

In the cold boot sub-state 232 the switching regulator architecture 10 remains capable of outputting 1.2V, 1.8V, and 3.3V. The major tasks performed here include providing display functionality (e.g., in a liquid crystal device (LCD)), providing digital to analog converter (DAC) functionality, and providing cellular telephone (GSM) functionality.

The standby sub-state 240, within the run state 214 is reached when the cold boot state 212 completes and the PDA is ready for general use. The standby sub-state 240 uses a 32 KHz secondary oscillator, where the relatively low frequency facilitates power conservation yet permits the PDA to be responsive to transition to another state when needed. The switching regulator architecture 10 here remains capable of outputting 1.2V, 1.8V, and 3.3V, but the DAC and the GSM functions are now powered down.

A number of states can be reached from the standby sub-state 240. These include power off 220 and both of the power down sub-state 250 and the hibernate sub-state 252. The playback sub-state 242 and the call sub-state 254 are directly reachable but, as a matter of design choice, the capture sub-state 246 (i.e., to take a photograph) is not directly reachable. Instead, the menu sub-state 258 is reached via a fast interrupt request (FIQ) or a standard interrupt request (IRQ), and the capture sub-state 246 is then reachable from there.

The playback sub-state 242 here runs at 18 MHz, using a skipping arrangement wherein only portions of the 24 MHz primary oscillator signal is used. This provides adequate speed and power for the actual task at hand. The DAC is now on, for audio playback, but the GSM is still powered down.

The call sub-state 244 here runs at 24 Mhz (i.e., making full use of the 24 Mhz primary oscillator), and the DAC and the GSM units are now both on. The capture sub-state 246 here runs at 48 MHz (the 24 Mhz primary oscillator doubled) and a camera (CAM) unit is now on.

The menu sub-state 248 here runs at 80 Mhz (derived with a PLL from the primary oscillator). As was the case for the cold boot sub-state 232, the PDA typically remains in the menu sub-state 248 briefly, and here especially such a high clock rate is justified to provide utmost responsiveness to user inputs. Full keyboard (KEY) scanning is turned on here.

The warm boot state 216 is relatively straightforward and is not described in detail herein, since the above discussion of the PDA state diagram 210 should have already served to illustrate the range of loads and the complex operating conditions that the inventive switching regulator architecture 10 needs to be able to efficiently accommodate.

Turning now to all of FIGS. 2-4 collectively, it should be clear from FIG. 3-4 that the PDA represented by these has very dynamically changing needs for power. The switching regulator architecture 10 in FIG. 2 can serve these needs in two ways. First, the variable strength controller 18 can sense Vout, at the feedback terminal 42, via the feedback network 24, and similar to conventional switching regulators the inventive switching regulator architecture 10 can reactively respond to this. Unlike conventional switching regulators, however, the inventive switching regulator architecture 10 can respond with much better "resolution" or "granularity" by virtue of having 16 available drive strength increments rather than just one. Second, the inventive switching regulator architecture 10 can proactively provide a particular drive strength based on what the variable strength controller 18 receives on the control bus 44. Since the dynamic load (here the PDA) "knows" what its needs are based on the PDA state diagram 210, it is a straightforward matter to programmatically control the inventive switching regulator architecture 10 so that those needs are optimally served. For this a microprocessor in the PDA can determine what drive strength increment is appropriate and send a signal requesting this to the variable strength controller 18 via the control bus 44, or a microprocessor in the PDA can send a signal advising the variable strength controller 18 via what it (the load) is doing and the variable strength controller 18 can then determine what drive strength increment is appropriate and provide it accordingly. All of these approaches are encompassed by the spirit of the present invention, although most system designers will probably elect to use the PDA instructs the power supply approach.

While various embodiments have been described above, it should be understood that they have been presented by way of example only, and that the breadth and scope of the invention should not be limited by any of the above described exemplary embodiments, but should instead be defined only in accordance with the following claims and their equivalents.

INDUSTRIAL APPLICABILITY

The present switching regulator architecture 10 is well suited for application in modern electronics devices, particularly ones characterized by having widely changing load conditions and especially ones where change is by device mode selection and thus is usable as an additional control input to the inventive switching regulator architecture 10.

Briefly, the present invention employs programmable drive strength switching transistors based, preferably in a pulse width modulated (PWM) architecture instead of in the traditional pulse-skipping architecture (PFM). This approach decouples the output transistors and permits selectively controlling them to minimize conversion losses. Power supply circuitry in accord with the present invention can be constructed with just-enough transistors and with suitable power-management control capabilities to supply respective load currents that are anticipated for the various operations in an application.

This inventive approach minimizes the need for an external low voltage drop out (LDO) regulator. It also minimizes the need for large bypass capacitors to minimize output voltage ripple, as are often needed by prior art approaches (e.g., to maintain high audio quality in a music player).

For the above, and other, reasons, it is expected that embodiments of the present invention, such as the exemplary switching regulator architecture 10 discussed herein, will have widespread industrial applicability and it is therefore expected that the commercial utility of the present invention will be extensive and long lasting.

The invention claimed is:

1. A controller for a switching regulator comprising:
   a control bus;
   a plurality of drive terminals; and
   wherein the controller determines from a signal received on said control bus a given one of a plurality of drive strength increments needed to supply a current load condition based proactively on changing from one state to another state, and outputs pulse modulated drive signals on a given set of said plurality of drive terminals to provide said given drive strength, wherein each set includes a different total number of said plurality of drive terminals.

2. The controller of claim 1, wherein said pulse modulated drive signals output on one or more of said plurality of drive terminals are suitable to drive semiconductor devices of a first type and said pulse modulated drive signals output on two or more of said plurality of drive terminals are suitable to drive semiconductor devices of a second type.

3. The controller of claim 2, wherein said semiconductor devices are field effect transistors.

4. The controller of claim 1, wherein said pulse modulated drive signals are pulse width modulated drive signals.

5. A process for providing power to a load having dynamic power needs, the process comprising:
   determining a given one of a plurality of binary incremental drive strengths needed to supply a current load condition based on a current one of a plurality of states of said load; and
   outputting pulse modulated signs for activating a given set of a plurality of transistors to provide said given binary incremental drive strength, wherein each set includes a different total number of said transistors.

6. The process of claim 5, wherein said pulse modulated drive signals are pulse width modulated drive signals.

7. The process of claim 5, wherein said pulse modulated drive signals are pulse frequency modulated drive signals.

8. The process of claim 5, wherein said determining is based on an external instruction.

9. The controller of claim 1, wherein said pulse modulated drive signals are pulse frequency modulated drive signals.

10. A switching regulator comprising:
    an inductor;
    a capacitor coupled across an output node;
    two or more switching transistors of a first type, each for selectively transferring energy from an input node to said inductor when activated;
    one or more switching transistors of a second type, each for selectively transferring said energy from said inductor to said capacitor when activated;
    a controller including,
      a control bus,
      a plurality of drive terminals, wherein each drive terminal is coupled to a respective one of said plurality of switching transistors,
    wherein said controller determines from a proactive indicator received on a control bus a given one of a plurality of drive strength increments, and activates using pulse modulation a given one of a plurality of sets of said switching transistors from said plurality of drive terminals to provide said given drive strength, wherein each set activates a different total number of switching transistors.

11. The switching regulator of claim 10, wherein said proactive indicator comprises an instruction specifying a new state of a load coupled to said output node.

12. The switching regulator of claim 10, wherein:
    said two or more switching transistors of said second type comprise p-type field effect transistors; and
    said one or more switching transistors of said second type comprise n-type field effect transistors.

13. The switching regulator of claim 10, wherein said inductor, said capacitor and said switching transistors are coupled as a buck type regulator.

14. The switching regulator of claim 10, wherein said inductor, said capacitor and said switching transistors are coupled as a boost type regulator.

15. The switching regulator of claim 10, wherein said inductor, said capacitor and said switching transistors are coupled as a buck/boost type regulator.

16. The switching regulator of claim 10, wherein said controller activates:
    a first set of said switching transistors from said plurality of drive terminals to provide a first drive strength in a standby state;
    a second set of said switching transistors from said plurality of drive terminals to provide a second drive strength in a power on self-test state;
    a third set of said switching transistors from said plurality of drive terminals to provide a third drive strength in a playback state;
    a fourth set of said switching transistors from said plurality of drive terminals to provide a fourth drive strength in a call state;
    a fifth set of said switching transistors from said plurality of drive terminals to provide a fifth drive strength in a capture state; and
    a sixth set of said switching transistors from said plurality of drive terminals to provide a sixth drive strength in a menu state and a cold boot state.

* * * * *